United States Patent Office 3,684,698
Patented Aug. 15, 1972

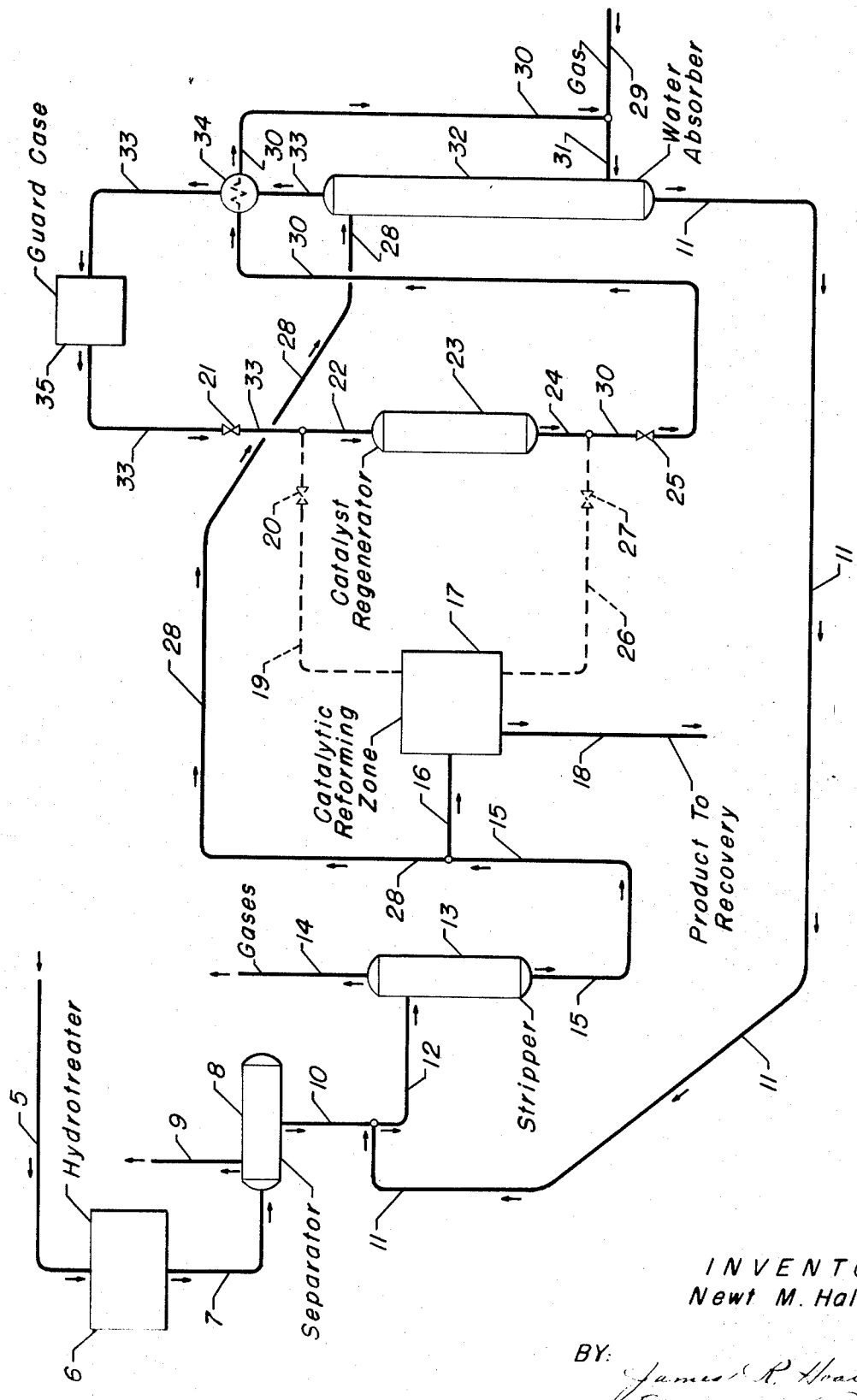

3,684,698
METHOD FOR CONDITIONING A WET REGENERATED PLATINUM REFORMING CATALYST
Newt M. Hallman, Mount Prospect, Ill., assignor to Universal Oil Products Company, Des Plaines, Ill.
Continuation-in-part of application Ser. No. 794,984, Jan. 29, 1969. This application Jan. 28, 1971, Ser. No. 110,689
Int. Cl. C10g 35/08
U.S. Cl. 208—140
10 Claims

ABSTRACT OF THE DISCLOSURE

A method for conditioning a wet, regenerated platinum catalyzed reforming system which comprises contacting the wet, regenerated catalyst with a dry gaseous medium prepared by the passage of a wet gaseous medium to a water absorption zone containing a naphtha desiccant. The gaseous medium may be nitrogen, hydrogen or flue gas.

CROSS-REFERENCE TO RELATED APPLICATION

This application is a continuation-in-part of my co-pending application, Ser. No. 794,984 filed Jan. 29, 1969 and now abandoned, the teachings of which are specifically incorporated by reference herein.

BACKGROUND OF THE INVENTION

This invention relates to a novel method for conditioning a regenerated, wet, platinum catalyzed reforming system. This invention specifically relates to a catalytic reforming process for upgrading a naphtha fraction utilizing a regenerated platinum catalyst containing water which is to be dried and maintained at a predetermined high level of activity.

The reforming of hydrocarbons such as a naphtha fraction derived from petroleum by utilizing a platinum group containing catalyst such as platinum, is well known to those trained in the art. In these reforming operations the naphtha feedstock, in a gaseous physical state, is admixed with hydrogen and contacted with a platinum containing catalyst under reforming conditions including an elevated temperature and pressure, to cause at least a portion of the feedstock to be converted to upgraded products such as reformate, or gasoline boiling range materials such as benzene, toluene and xylenes. In addition, it is well known to those trained in the art that the naphtha feedstock to be reformed must be relatively free of sulfurous impurities. Accordingly, it is the practice in the reforming art to catalytically hydrotreat the naphtha with hydrogen at elevated temperatures and elevated pressures to convert the sulfurous impurities to gaseous hydrogen sulfide. This hydrogen sulfide, which is in solution with the naphtha as the naphtha emanates from the catalytic hydrotreater, has the hydrogen sulfide stripped therefrom by means well known to those trained in the art prior to reforming the naphtha with a platinum containing catalyst.

The prior art reforming processes may be divided into generally two known types of operation; a non-regenerative type and a regenerative type. According to the practice of the non-regenerative type of reforming process, the catalyst is continuously utilized for uninterrupted, extended periods of time such as from about 4 to 5 months upwards to one year or more, depending upon the quality of the catalyst, reforming conditions utilized and the product quality sought. Following this extended period of time, the catalyst is regenerated or replaced by fresh catalyst while the plant is offstream. In the regenerative type of reforming operation, a reforming catalyst, typically contained as a fixed bed, is frequently regenerated, sometimes daily, by utilizing a spare or stand-by reactor which is periodically brought onstream while a companion reactor is taken offstream and regenerated. This regenerative type of reforming operation may also be practiced by a moving bed technique wherein a bed of reforming catalyst is continuously moving between a reaction zone and a regeneration zone.

It is evident in this brief, prior art description that each type of reforming operation requires the regeneration or replacement of the platinum catalyst at periodic intervals. Since platinum is a precious metal, it is desirable to regenerate or reuse the catalyst as much as possible since the recovery of the platinum metal in spent catalyst and subsequent impregnation on a new support is a time-consuming and expensive procedure.

In addition, it is well known to those trained in the art that a platinum reforming catalyst usually contains a halogen, particularly fluorine and/or chlorine. These halogen-containing catalysts are, in many instances, susceptible to deterioration from the presence of moisture. However, the techniques utilized in regenerating deactivated, reforming catalysts involve the oxidation of hydrocarbonaceous deposits which produces water as a by-product in the regeneration reaction which remains on the catalyst. Thus, it is necessary that the excessive amounts of moisture remaining on the catalyst at the termination of the regeneration procedure be removed to prevent rapid deactivation of the reforming catalyst when it is placed back onstream for the reforming of naphtha. The prior art has, to some extent, recognized the problem associated with water remaining on regenerated platinum reforming catalysts and recent catalytic reforming processes have incorporated elaborate drying systems of the solid desiccant type to help alleviate this problem.

Illustrative of the prior art reforming processes wherein the presence of undesired amounts of water is recognized as undesirable are the following U.S. patents: Capsuto 3,234,120; Hengstebeck 2,908,653; Haxton et al. 2,952,-611; Steffgen 2,965,563; Schmitkons et al. 3,011,967 and Bergstrom 3,069,348. In all of these prior art processes, the regenerated, platinum catalyst containing water is conditioned prior to being placed back onstream by stripping the moisture content from the catalyst with a dry gaseous medium such as hydrogen, nitrogen or flue gas prepared and dried solely by solid desiccant drying techniques.

However, solid desiccant drying techniques, as illustrated by the previously enumerated patents, has significant disadvantages not in the least of which is a requirement that the desiccant itself must be periodically regenerated or discarded since solid dessicant drying techniques inevitably are a semi-continuous process. Both of these choices are relatively exposive to the particular refiner and involve the undesired handling of rather large amounts of spent solids.

Accordingly, it would be desirable if a regenerated, catalytic reforming system could be operated in a facile and economic manner while minimizing the effects of moisture within the system. More appropriately, it would be desirable to operate a regenerated platinum containing catalytic reforming system by minimizing the effects of moisture within the system without utilizing desiccants of a solid type.

SUMMARY OF THE INVENTION

Accordingly, it is an object of the present invention to provide an improved catalytic reforming process.

It is another object of this invention to provide an improved catalytic reforming process wherein catalyst activity of a regenerated catalyst is maintained at a predetermined high level.

It is still another object of this invention to provide an improved method for conditioning a regenerated platinum catalyzed hydrocarbon reforming system in a facile and economical fashion.

It is a specific object of the present invention to provide an improved method for conditioning a regenerated platinum catalyzed hydrocarbon reforming system in a manner which removes moisture in the catalytic system in a facile and economical manner without the need for elaborate solid desiccant drying techniques.

These objects are accomplished by utilizing a portion of a stripped, hydrotreated naphtha as a liquid desiccant for drying a wet, gaseous medium so as to form a dry gaseous medium capable of removing undesired amounts of moisture remaining on a regenerated, reforming catalyst. Thus, the present invention relates, in a broad embodiment, to an improvement in a method for conditioning a water-containing, regenerated, platinum reforming catalyst wherein prior to reforming, a hydrotreated naphtha is stripped of hydrogen sulfide in a stripping zone to provide a stripped naphtha charge for passage to a platinum catalyzed reforming zone for contact therein with a platinum reforming catalyst. This conditioning includes the removal of excessive amounts of water remaining on the platinum catalyst after termination of a regeneration operation by contacting the catalyst with a dry carrier gas at conditions sufficient to remove contaminating amounts of water from the catalyst. The particular improvement involves the contacting of a wet carrier gas with at least a portion of the stripped naphtha charge in a water absorption zone under conditions sufficient to provide a dry carrier gas suitable for removing moisture from the platinum catalyst and a wet naphtha stream containing water removed from the wet carrier gas. The dry carrier gas is then contacted with the water-containing reforming catalyst under conditions sufficient to remove contaminating amounts of water in the catalyst thereby providing a water-containing carrier gas and a dry platinum catalyst suitable for use in the reforming of a stripped naphtha. The wet naphtha stream recovered from the water-absorption zone is passed to the stripping zone whereby the water contained in this naphtha stream is removed in admixture with the hydrogen sulfide, thereby producing a dry, stripped naphtha charge for passage to the reforming zone. Preferably the carrier gas utilized is hydrogen and at least a portion of the water-containing carrier gas produced by the removal of the contaminating amounts of water from the reforming catalyst is passed to the water absorption zone for the removal of water therefrom and to provide a dry recycle carrier gas.

In a more specific embodiment, the present invention relates to a continuous, regenerative process for the reforming of a hydrotreated naphtha charge containing hydrogen sulfide in a naphtha reforming zone containing a plurality of platinum catalyzed reformers, at least one of which reformers is onstream reforming a dry, hydrogen sulfide-free naphtha, and at least one of the reformers is offstream and contains a regenerated, water-containing platinum catalyst. In this continuous regenerative process, the naphtha charge is stripped, in conjunction with a hereinafter described wet naphtha stream, of hydrogen sulfide and water in a stripping zone maintained under conditions sufficient to provide a hydrogen sulfide-free, dried naphtha charge. Preferably, the naphtha charge is dried to a water content of less than 50 p.p.m. by weight water. At least a portion of the dried naphtha is passed to the onstream reformer for conversion to more valuable products, with at least another portion of the dried naphtha being contacted with a wet hydrogen stream in a water absorption zone under conditions sufficient to provide a dry, hydrogen stream containing a minor amount of naphtha and the hereinbefore specified wet naphtha stream. Preferably the dry halogen stream has a water content not in excess of that corresponding to a dew point of 150° F. at atmospheric pressure. The dry, naphtha-containing hydrogen is then contacted with a solid adsorbent in an adsorption zone maintained under conditions sufficient to provide a dry, essentially naphtha-free hydrogen stream. It is to be noted that this solid adsorbent does not function in the removal of moisture from the gaseous hydrogen but rather functions solely to remove the minor amounts of naphtha which may be contained in the hydrogen stream recovered from the water absorption zone. Preferably, this solid adsorbent is activated charcoal. The dry, naphtha-free hydrogen is then contacted with the regenerated water-containing platinum catalyst under conditions sufficient to remove contaminating amounts of water from the regenerated catalyst and to provide a wet hydrogen stream and a dry, reforming catalyst suitable for use in reforming a dry, hydrogen sulfide-free naphtha. Preferably, at least a portion of the wet hydrogen produced by the stripping of water from the water-containing regenerated reforming catalyst is passed to the water absorption zone for removal of water therein by the dry naphtha and is, after drying, to be recycled back to the water-containing regenerated catalyst.

In essence, therefore, the present invention provides a method for conditioning a regenerated catalyst containing excessive amounts of water following the regeneration of the catalyst which involves drying the catalyst with a dry carrier gas provided by denuding moisture from a wet carrier gas in a water absorption zone. This water absorption zone comprises the utilization of at least a portion of a stripped naphtha reformer feed as a liquid desiccant for absorbing water in the water absorption zone.

Other objects, embodiments and a more detailed description of the foregoing embodiments will be found in the following, more detailed description of the process of the present invention.

DETAILED DESCRIPTION OF THE INVENTION

It is well known to those trained in the reforming art, that conventional platinum containing reforming catalysts are sensitive to sulfurous impurities which may be contained in typical naphthas derived from the distillation of a petroleum crude oil. These sulfur-containing naphthas, prior to reforming, are hydrotreated to convert the organic sulfurous compounds contained in a naphtha to hydrogen sulfide which is readily removed from the naphtha to provide a sulfur-free naphtha feedstock suitable for reforming. This hydrotreating also removes any nitrogenous impurities from the naphtha. The particular method in which a sulfur containing naphtha is hydrotreated is not important to the process of the present invention. Accordingly, hydrotreating conditions well known to those trained in the art, such as a hydrogen pressure of about 100 p.s.i.g. to about 1500 p.s.i.g., and temperatures of about 500° F. to about 900° F. correlated to produce hydrogenating conditions, are all included within the generally broad scope of the present invention. Suitable hydrotreating catalysts typically comprise a Group VIII and/or a Group VI–B metal combined with a refractory inorganic oxide support such as alumina and/or silica. The metallic component may be associated therewith in either an elemental or sulfided state. A preferred catalyst for the hydrotreating of naphtha to remove sulfur therefrom is a silica, alumina, nickel and molybdenum composite. Illustrative of suitable methods for the removal of sulfur from a sulfur-containing naphtha are U.S. Pats. 2,758,064, 2,773,007, and 2,766,179.

Whatever particular hydrotreating method is utilized, the treated naphtha product typically emanates from a hydrotreating reactor at a high pressure and is passed to a high pressure receiver wherein, at a reduced temperature, a hyrogen sulfide containing hydrogen phase is separated from a liquid phase. This liquid phase, however, still contains appreciable amounts of dissolved hydrogen sulfide which must be stripped from the naphtha before the naphtha is suitable as a reforming chargestock. The hydrogen sulfide contained in solution with the naphtha feedstock is effectively removed by fractionating or stripping, the hydrogen sulfide containing solution at a temperature of about 100° F. to about 400° F. and a pressure of about 200 p.s.i.g. to produce an essentially sulfur-free naphtha charge. It is to be noted that these stripping conditions are also sufficient to remove any water present in an naphtha passed to the stripping zone for the removal of hydrogen sulfide. Accordingly, the removal of hydrogen sulfide simultaneously effects the removal of water.

The reforming catalyst to which the present invention is directed, and which may be regenerated according to procedures known to those skilled in the art, comprises a platinum group metal, preferably platinum, on a suitable refractory inorganic oxide support, such as alumina, silica-alumina or an acidic crystalline alumino-silicate. Preferably, the catalyst utilized is platinum on an alumina support containing from about 0.1% to about 3% by weight of platinum and, more preferably, from about 0.2% to about 1% by weight platinum. The preferred support for the platinum comprises alumina, although other supports known to those skilled in the art such as zirconia, magnesia, silica-alumina, magnesia-alumina, mordenite, faujasite, etc., may also be used with satisfactory results.

In particular, it is advantageous to combine the platinum with from 0.1% to about 8% by weight of a halogen such as fluorine and/or chlorine on an alumina support or molecular sieve support. This is the preferred catalyst to be utilized in the practice of the catalytic reforming reaction that occurs in the process of the present invention.

Catalytic reforming conditions are generally well known known and include a temperature of about 700° F. to about 1000° F., a pressure of about 25 p.s.i.g. to about 1000 p.s.i.g., a liquid hourly space velocity of about 0.2 hr.$^{-1}$ to about 10 hr.$^{-1}$ and a hydrogen to hydrocarbon mole ratio of about 1:1 to about 10:1. As those skilled in the art are familiar, the reforming reaction is endothermic in nature and therefore the reactor outlet temperatures are ordinarily significantly less than the inlet temperature to the reactor. Therefore, in a typical reforming system wherein a plurality of reforming reactors are utilized, the effluent from a given reactor is generally reheated to reaction temperature prior to reintroduction into the next, succeeeding reforming reactor.

In a reforming reaction, various chemical reactions occur, including hydrocracking. As a result of this hydrocracking the reforming catalyst has a hydrocarbonaceous material deposited on this catalytic surface. Further, since a reforming catalyst catalyzes a great number of individual reactions, such as dehydrogenation, isomerization, dehydrocyclization, etc., best results are often obtained when higher temperatures are utilized, in which event hydrocracking does take place and the catalyst becomes coated with a hydrocarbonaceous deposit. Depending on the reaction conditions utilized, the catalyst may be used in a reforming process for a relatively long period of time without substantial loss of catalyst activity. For this reason, some reforming processes are generally considered as non-regenerative in nature. However, sooner or later, the reforming catalyst does become carbonized and eventually requires reactivation or regeneration for a commercially feasible operation.

Usually, it is desired to maintain the activity of the catalyst at a predetermnied high level in order to produce a consistent, upgraded product at an economically attractive conversion level for conventional naphtha feedstocks. As used herein, the term "activity," or other words of similar import, including "conversion," is intended to embody any definition which is representative of the ability of a reforming catalyst to convert a hydrocarbonaceous material or naphtha chargestock in any reforming reaction zone to the desired upgraded product. For example, this term is representative of the ability of the catalyst to convert a product of relatively low octane number to a desired high octane number in the range of, for example, from 90 to 100 octane numbers at a given temperature, pressure and space velocity. Therefore, a catalyst which converts a 45 octane number naphtha to a 96 to 100 octane number product, is more active than one which converts the same feedstock to a product of only 90 to 92 octane number under the same operating conditions. Accordingly, those skilled in the art are generally familiar with the term "activity" of a catalytic reforming process, and a more precise discussion thereof need not be presented herein.

The important concept involved in the process of the present invention, however, is that the catalyst activity in a reforming system be maintained substantially at a predetermined level by the periodic reactivating of the catalyst within the system, either while the system is onstream or while one reactor is removed from the system and a swing reactor is reintroduced into the system while the catalyst in the removed reactor is regenerated. The concepts involved in the present invention are intended to apply to all systems wherein a catalytic reforming system containing platinum is regenerated under conditions which leave the catalyst in a wet state, i.e., an excessive amount of water remains in the catalyst.

Regeneration techniques for regenerating deactivated platinum group containing reforming catalysts, are well known to those skilled in the reforming art and are not, per se, part of the present invention. It is only a requirement of this invention that a regenerated, reforming catalyst, prior to reintroduction into a catalytic reforming zone or prior to the utilization of the catalyst in reforming a naphtha, contain an excessive amount of moisture which would be damaging to the catalyst or to the reforming system if not removed prior to bringing the reactor in question onstream for the reforming reaction. The typical prior art method of regenerating a platinum containing catalyst, in addition to the prior art methods hereinbefore disclosed, may be found in U.S. Pat. No. 2,641,582. As illustrative of various methods of regeneration, the contents of these cited patents are incorporated herein by reference so that a more detailed discussion of regeneration techniques need not be presented herein. In brief, however, these patents typically teach a method for reactivating a catalyst containing a noble metal such as platinum, which comprises treating the catalyst with an oxygen-containing gas at a temperature below about 800° F. followed by a subsequent treatment at a temperature of above about 800° F. The products of such a regeneration include carbon oxides together with a considerable amount of water vapor, at least a portion of which water remains on the surface of the catalyst upon the termination of the regeneration.

According to the practice of this invention, no attempt is made to maintain a regeneration cycle in a dry state such as that practiced by certain operations in the prior art. Accordingly, the water vapor produced in the regeneration is permitted to build up in the reforming system until the reforming catalyst regeneration cycle is complete. At that point, except for the contaminating qualities of water which remain, the regenerated catalyst is at its predetermined activity and is suitable for reuse in a reforming reaction zone for the conversion of naphtha to more valuable products.

The conditioning of the regenerated, platinum reforming catalyst and the merging of this conditioned catalyst into a catalytic reforming system requires that the wet, regenerated catalyst be contacted with a dry carrier gas under conditions suitable for removing the excessive moisture in the catalyst. A preferred carrier gas is hydrogen since it is readily available in a reforming operation because it is produced therein. If initially dry carrier gas is not available, such a dry gas stream is prepared according to the process of the present invention by introducing a wet carrier gas into a water absorption zone in contact with dry, naphtha reformer charge under conditions to remove the water from the gas stream. As a dry carrier gas contacts the wet catalyst, a wet carrier gas stream is produced and is removed from the catalyst drying step and is preferably introduced into a water absorption zone to remove the water from the gas. The dried carrier gas is then returned to the regeneration zone or, more specifically, the drying zone for completion of the conditioning cycle and water removal from the catalyst. This cycle is continued until the water level in the regenerated catalyst reaches a suitable dry level, such as less than 100 parts per million by weight, in the wet carrier gas leaving the regeneration zone. The exact conditions and moisture contents desired in the dried regenerated catalyst are not, per se, part of the present invention. Therefore, any of the conditions and water concentrations discussed and enumerated in the previously cited prior art are incorporated by reference herein so that a more detailed discussion need not be presented.

As previously indicated, in the present invention, the dried naphtha feedstream utilized to dry a wet carrier gas so as to produce a dry carrier gas suitable for drying the wet, regenerated catalyst, is provided by a conventional stripping process following a hydrodesulfurization process (hydrotreating) for removing sulfur from a sulfur-containing naphtha chargestock. It has been found that this stripped naphtha is suitably dry for use as a liquid desiccant in the removal of moisture from carrier gases which are to be utilized to remove moisture from a wet, regenerated reforming catalyst. The wet naphtha formed in a water absorption zone is then conveniently returned to the stripping operation wherein the moisture contained in the naphtha is removed therefrom and the drying cycle may be repeated. The advantage of this mode of operation is obvious. The only additional equipment needed in a conventional reforming process is a water absorption zone which is less expensive and more simply operated than is a solid desiccant system since this system eliminates the complicated, attendant regeneration facilities required by a solid system. This simplicity of the system embodied in the present invention, revolves around the utilization of the stripper utilized to remove hydrogen sulfide from a hydrotreated naphtha feedstock in a dual function. Namely, this stripper is utilized not only to remove hydrogen sulfide from the hydrotreated naphtha, but is also utilized to provide a dried naphtha capable of drying a wet carrier gas. The wet naphtha produced as a result has its moisture content readily removed by passage back to this stripper.

The exact physical method of contacting a wet carrier gas and a dry naphtha to remove moisture from the wet carrier gas is well known to those trained in the art. A preferred method, however, is the countercurrent contact of the naphtha with an upflowing, wet carrier gas at a temperature of about 100° F. to about 400° F. and a pressure of about 100 p.s.i.g. to about 300 p.s.i.g. A particularly preferred temperature is that temperature at which the dried naphtha feedstock is at when it emanates from the stripping operation. In practice, the water absorber operates to dry the circulating carrier gas in the regeneration or drying system, under conditions sufficient to produce a dry carrier gas having a water content not in excess of that corresponding to a dew point of 150° F. at atmospheric pressure.

Depending on the exact temperature and pressure utilized in the water absorption zone, a minor amount of naphtha may be carried over in the dry carrier gas produced in the water absorption zone. If this occurs in a preferred embodiment of this invention, it is desired that this naphtha content be removed prior to contact with the regenerated platinum catalyst. This removal is readily accomplished by contacting the dry, naphtha-containing hydrogen with a solid adsorbent, preferably activated charcoal, is an adsorption zone maintained under conditions well known to those trained in the art, and sufficient to provide a dry, essentially naphtha-free carrier gas stream. Removal of the naphtha is particularly desirable wherein the conditions utilized in removing the water from the wet, regenerated catalyst include relatively high temperatures and low pressures since some of the naphtha contained in the dry carrier gas may form carbonaceous deposits on the catalyst when contacted therewith. These deposits could possibly lower the activity of the reforming catalyst when it is placed back onstream.

DESCRIPTION OF THE DRAWING

The process of the present invention can be most clearly described by reference to the attached drawing, schematically illustrating the reforming of a sulfur-containing naphtha. Of necessity, certain limitations must be present in a schematic diagram of the type presented and no intention is made thereby to limit the scope of this invention to reactants, weights, operating conditions, catalysts, etc. Miscellaneous appurtenances including valves, pumps, compressors, separators, reboilers, etc., have been eliminated. Only those vessels and lines necessary for a complete and clear understanding of the invention are presented, with any obvious modifications made by those possessing expertise in the art of naphtha hydrotreating and naphtha reforming being included within the generally broad scope of the present invention.

By way of emphasis, the present drawing is directed to a prior art regenerative system although the present invention is to be understood to be applicable to both a regenerative system and a non-regenerative system as defined herein so long as the platinum catalyst is, in fact, regenerated and, after regeneration, contains undesired amounts of water. In such prior art regenerative reforming systems there is an increasing average temperature in each successive reactor. As a result, the catalyst in each succeeding reactor becomes deactivated at a faster rate than the catalyst maintained in the reactors upstream to the hydrocarbon flow. In order to insure a high quality product throughout the onstream period, the catalyst in the reactors are periodically regenerated by procedures well known to those trained in the art. For example, the procedure of blocking out a given reactor, sometimes called a "swing" reactor, while the remaining reactors are continued in a normal process sequence, is commonly employed in the art.

The blocked-out reactor, for regeneration purposes, is first depressured and then purged with an inert gas. After purging, an oxygen-containing gas is introduced and the regeneration procedure initiated. Following regeneration and conditioning according to the practices of this invention, the reactor is started up and placed onstream by repressuring the reactor with hydrogen gas and opening the appropriate valves, thereby placing the unit onstream into the reforming cycle. Subsequently, another reforming reactor is regenerated in substantially the same procedure. This swing reactor system is illustrated in the appended drawing, although the catalyst regeneration and conditioning techniques could also be applied to a continually moving bed technique, also illustrated, wherein the reforming catalyst is withdrawn and regenerated in an isolated regeneration zone. Likewise, the present invention may be applied to a procedure wherein the entire reforming plant is shut down and the catalyst regenerated in each reactor substantially at the same time.

Referring to the attached schematic drawing, a suitable hydrocarbon feedstock boiling within the range of 200° F. to about 360° F. containing 0.2% sulfur and having a research octane number of about 45, is passed, in admixture with hydrogen, via line 5 and is desulfurized in hydrotreating zone 6 over a cobalt-nickel catalyst. The effluent from hydrotreating zone 6 leaves via line 7 and contains desulfurized naphtha, a residual hydrogen, acid gases such as $CO_2$ and $H_2S$, nitrogenous compounds, and a small amount of normally gaseous hydrocarbons. This effluent in line 7 is passed to separator 8 wherein the majority of the hydrogen present in the reactor zone effluent, and a portion of the hydrogen sulfide and light hydrocarbons are removed via line 9.

The hydrocarbon effluent from separation zone 8 is removed via line 10 and admixed with a wet, liquid recycle stream from a source hereinafter described, entering via line 11 and passed via line 12 to stripper column 13. Stripper column 13 comprises a conventional vapor liquid contacting column and may contain sieve plates, bubble cap plates, Beryl saddles and the like which are suitable for contacting a vapor and liquid within stripping zone 13. Operating conditions are conventional and are well known to those trained in the art and are sufficient to produce a gaseous stream containing the hydrogen sulfide contained in stream 10 and the water contained in stream 11 as well as some normally gaseous hydrocarbons and hydrogen and which are withdrawn from stripper column 13 via line 14.

A dry, hydrocarbon feedstock (dry naphtha) containing less than 50 parts per million water is withdrawn from stripper column 13 via line 15. A major portion of this desired dried naphtha in line 15 is passed via line 16 to catalytic reforming zone 17 which is maintained under conventional reforming conditions. Contained, for example, in reforming zone 17 is an alumina support containing about 0.4% by weight platinum and about 0.6% halogen. The effluent from the catalytic reforming zone 17 is withdrawn via line 18 and passed to a conventional recovery facility not illustrated, which will separate the reforming effluent into a normally liquid reformate and a normally gaseous hydrocarbon stream such as $C_3$ and $C_4$ hydrocarbons.

After a period of time, the platinum reforming catalyst contained in reforming zone 17 becomes deactivated, in which case the deactivated catalyst could be removed via line 19 through valve 20 and line 22 and passed to catalyst regenerator 23; valves 21 and 25 being closed. This transfer may be made by the prior art moving bed technique, or catalyst regenerator 23 could be simply a reactor of reforming zone 17 isolated, as illustrated herein, to represent a configuration known to those well skilled in the art, as a "swing" reactor. Valve 27 is also closed thereby preventing flow to conduit 26 which returns to catalytic reforming zone 17. Following the transfer of catalyst to regenerator 23, valve 20 is closed and valves 21 and 25 opened, thereby permitting dry carrier gas, such as nitrogen, to pass through lines 33 through regenerator 23 and out of regenerator 23 via lines 24, 30 and valve 25. At this point, the catalyst is then regenerated.

For illustrative purposes, it should be emphasized that the actual steps of catalyst regeneration have been omitted since these are conventional and well known to those skilled in the art. At this point in time, the catalyst regenerator 23 has been regenerated but contains an excessive amount of water. Therefore, carrier gas removed in line 24 is wet since it has removed water from the reforming catalyst contained in regenerator 23. As indicated, the wet carrier gas is removed via line 24 through line 30 and is passed to heat exchanger 34, for cooling thereof and then to line 31 to water absorber 32. In actual practice, the wet carrier gas after cooling would have the gross water which would condense out from the gas upon cooling separated from the gas, by means not shown, prior to introduction of the wet gas into water absorber 32. Additional make-up gas, as needed, may be introduced into the system via line 29.

Likewise, if the carrier gas were not in fact dry when initially passed into the system, it would be first passed to water absorber 32 via line 29 prior to contact with the regenerated reforming catalyst.

Water absorber 32 is a vapor liquid contacting device whereby a wet carrier gas is contacted, preferably in a countercurrent fashion, with the dry liquid naphtha desiccant which is introduced into the upper portion of absorber 32 via line 28. It is to be remembered that the dry naphtha in line 28 was obtained from a dried naphtha emanating from separation zone 13 in line 15, at least a portion of which was passed to the onstream catalytic reforming reactors contained in catalytic reforming zone 17. The remaining portion of the dried naphtha is passed via line 28 through appropriate valves to water absorber 32 as a liquid desiccant in the manner previously discussed.

Suitable operating conditions maintained in absorber 32 may include a temperature of about 100° F. to 150° F. and a liquid naphtha desiccant to wet carrier gas mole ratio of about 0.01 to about 1. In any event, it is preferred that the operating conditions maintained in water absorber 32 are correlated to produce a gaseous stream comprising dry carrier gas having a water content not in excess of that corresponding to a dew point of 150° F. at atmospheric pressure. This dried carrier gas stream is removed from water absorber 32 via line 33 and passed to heat exchanger 34 in order to pick up any heat from the returning wet carrier gas in line 30. It has been found that the dry carrier gas in line 33 also contains a minor amount of naphtha which has been carried out of water absorber 32 and which may be a contaminant in the carrier gas when passed to catalyst regenerator 23. In one embodiment of this invention, the naphtha contaminant is removed in guard case 35 which may be an absorption zone containing a solid absorbent such as activated charcoal or activated clay. This guard case 35 is maintained under suitable operating conditions known to those trained in the art sufficient to denude the dry carrier gas of any possible contaminating quantities of liquid naphtha desiccant. The resultant dry, naphtha-free carrier gas is removed from guard case 35 via line 33, valve 21, line 22 and passed through regenerator 23 to complete the cycle. The cycling of the carrier gas is then continued as discussed until the catalyst in regenerator 23 is dry and suitable for reuse in catalytic reforming zone 17.

Removed from water absorber 32 via line 11 is a rich, naphtha liquid containing the water removed from the wet carrier gas. This wet naphtha is passed via line 11 to admix with the hydrogen sulfide containing naphtha in line 12 and passed, as previously indicated, to stripper 13 whereby the absorbed water is removed from the system via line 14 in admixture with hydrogen sulfide.

From the foregoing description, it is obvious to one trained in the art that a novel method for conditioning a water-containing, regenerated platinum reforming catalyst is available. This method eliminates the need for large quantities of solid desiccants and results in the addition of only a water-absorption zone to a conventional reforming system presently equipped without drawing facilities. The addition of this water absorption zone only is required since the stripper utilized to strip hydrogen sulfide from a hydrotreated sulfur containing naphtha will also simultaneously effect the removal of water from the naphtha. Thus, an improved catalyst conditioning technique for conditioning a wet, regenerated platinum reforming catalyst is available in a facile and economical manner.

I claim as my invention:

1. In a method for conditioning a water containing regenerated, platinum reforming catalyst wherein a hydrotreated naphtha is stripped of hydrogen sulfide in a stripping zone to provide a stripped naphtha charge for passage to a platinum catalyzed reforming zone for contact with a platinum reforming catalyst, said conditioning including the removal of excessive amounts of water remaining on said catalyst after the termination of the regeneration thereof by contacting said catalyst with a dry carrier gas at conditions sufficient to remove contaminating amounts of water from said catalyst, the improved conditioning method which comprises the steps of:

(a) contacting a wet carrier gas with at least a portion of said stripped naphtha charge in a water absorption zone under conditions sufficient to provide said dry carrier gas and a wet naphtha stream containing water removed from said wet carrier gas;

(b) contacting said water-containing reforming catalyst with said dry carrier gas under conditions sufficient to remove contaminating amounts of water from said catalyst, thereby providing a water-containing carrier gas and a dry platinum catalyst suitable for use in said reforming zone; and (c) passing said wet naphtha stream of step (a) to said stripping zone whereby water contained in said stream is removed in admixture with said hydrogen sulfide, thereby producing a dry, stripped naphtha charge suitable for passage to said reforming zone.

2. The improvement of claim 1 wherein said carrier gas is hydrogen.

3. The improvement of claim 1 wherein at least a portion of said water-containing carrier gas produced in step (b) is passed to said water absorption zone of step (a).

4. The improvement of claim 1 wherein said dry carrier gas of step (a) contains minor amounts of naphtha which are removed therefrom by passing said dry carrier gas, prior to contacting with said catalyst, to a hydrocarbon adsorption zone in contact with a solid adsorbent under conditions sufficient to remove naphtha from said gas, thereby producing a dry, naphtha-free, carrier gas.

5. The improvement of claim 1 wherein said adsorbent is activated charcoal.

6. A continuous, regenerative process for the reforming of a hydrotreated naphtha charge containing hydrogen sulfide in a naphtha reforming zone containing a plurality of platinum catalyzed reformers, at least one of said reformers on a stream reforming a dry, hydrogen sulfide-free naphtha and at least one of said reformers offstream, containing a regenerated, water-containing platinum catalyst which comprises the steps of:

(a) stripping said naphtha charge, and a hereinafter specified wet naphtha stream, of hydrogen sulfide and water in a stripping zone maintained under conditions sufficient to provide a hydrogen sulfide free, dried naphtha charge;

(b) passing at least a portion of said dried naphtha to said onstream reformer;

(c) contacting at least another portion of said dried naphtha and a wet hydrogen stream in a water absorption zone under conditions sufficient to provide a dry hydrogen stream containing a minor amount of naphtha and said specified wet naphtha stream;

(d) passing said wet naphtha stream to said stripping zone of step (a);

(e) contacting said dry, naphtha-containing hydrogen with a solid adsorbent in an adsorption zone maintained under conditions sufficient to provide a dry, essentially naphtha-free, hydrogen stream; and (f) contacting said regenerated, water-containing, platinum catalyst with said dry, naphtha-free hydrogen stream under conditions sufficient to remove contaminating amounts of water from said catalyst and to provide a wet, hydrogen stream and a dry, reforming catalyst suitable for use in reforming a dry, hydrogen sulfide-free naphtha.

7. The process of claim 6 wherein at least a portion of said wet hydrogen of step (f) is passed to the water absorption zone of step (a).

8. The process of claim 6 wherein said dry hydrogen has a water content not in excess of that corresponding to a dew point of 150° F. at atmospheric pressure.

9. The process of claim 6 wherein said dried naphtha has a water content of less than 50 p.p.m. by weight.

10. The process of claim 6 wherein said adsorbent is activated charcoal.

References Cited

UNITED STATES PATENTS

| | | | |
|---|---|---|---|
| 850,680 | 4/1907 | Smith | 55—30 |
| 2,866,747 | 12/1958 | Kearby et al. | 208—140 |
| 2,908,653 | 10/1959 | Hengstebeck | 208—140 |
| 2,952,611 | 9/1960 | Haxton et al. | 208—140 |
| 2,965,563 | 12/1960 | Steffgen et al. | 208—140 |
| 2,995,203 | 8/1961 | Maurer | 55—29 |
| 3,011,967 | 12/1961 | Schmitkons et al. | 208—140 |
| 3,069,348 | 12/1962 | Bergstrom | 208—140 |
| 3,224,212 | 12/1965 | Engdahl | 55—29 |
| 3,234,120 | 2/1966 | Capsuto | 208—140 |

HERBERT LEVINE, Primary Examiner

U.S. Cl. X.R.

55—29, 30; 208—89, 138; 252—416